May 10, 1955     L. R. KALB     2,707,996
SHEARING DEVICE WITH ADJUSTABLY MOUNTED SHEAR BLADE
Filed Nov. 27, 1951
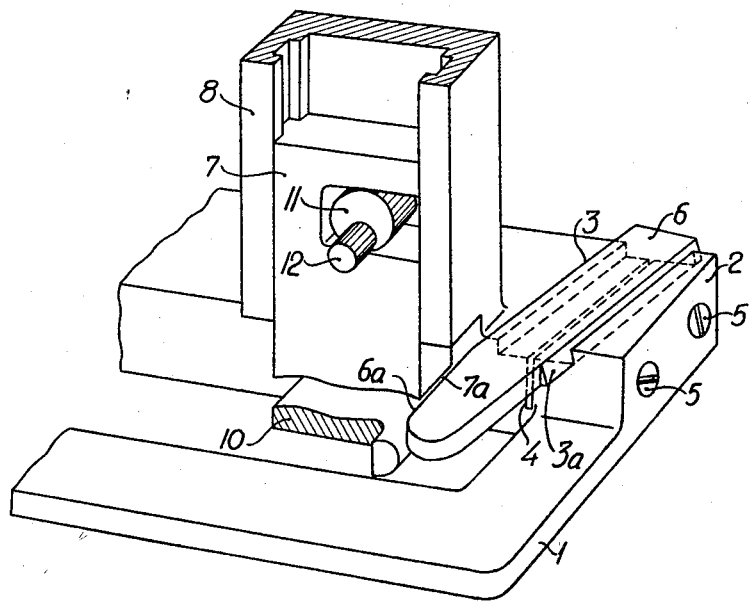

United States Patent Office 2,707,996
Patented May 10, 1955

2,707,996
SHEARING DEVICE WITH ADJUSTABLY MOUNTED SHEAR BLADE
Lennart Reinhold Kalb, Solna, Sweden
Application November 27, 1951, Serial No. 258,474
3 Claims. (Cl. 164—58)

This invention relates to improvements in adjustable shearing devices having a pair of shear cutters or blades, particularly for shearing sheet metal and metal straps, for instance in so called strapping apparatus for packing purposes. The cutting device according to the invention is of the type in which one or both of said shearing cutters or blades are movable in opposite directions close to one another so as to effect a shearing action between the cutting edges of the cutters or blades.

The main purpose of the invention is to effect, in cutting devices of this kind, a simple adjustment of the lateral or transverse space (in a plane perpendicularly to the cutting movement) between the cutting edges of the shear cutters or blades so that a subsequent adjustment of said space may take place according to the wear of the cutting edges. According to the invention at least one of the cuting edges of the shearing cutters or blades is formed along a side portion of a rod, bar or plate which is displaceable lengthwise in a holder or guideway which extends in a direction that is inclined at a slight angle to the length of the cutting edge, such displacement serving to move the cutting edges closer or farther away from the cooperating cutting edge of the other cutter without changing the longitudinal direction of the cutting edge.

One embodiment of the invention is shown diagrammatically in the accompanying drawing, in which:

Figure 1 illustrates a perspective view of the device with some parts in section; and Figure 2 is a cross section of a part thereof.

The drawing illustrates an apparatus that may be used as part of a strapping machine, this particular apparatus cutting the steel straps as supplied from a continuous roll after an article to be strapped has been encircled.

The device comprises a base plate having two offset parts 1 and 2, the top part 2 having a groove 3 which at its bottom is provided with a vertical slot 4 extending into the material of the part 2. Extending transversely in borings in the part 2 and through said slot 4 are clamping screws 5 which can be tightened or adjusted from the outside of the part 2 so as to compress or narrow the slot 4 and thus squeeze a shear blade 6 in the form of a rod, bar or plate fitted in the groove 3. The bar 6 has a cutting edge 6a which inclines at a small angle to the longitudinal axis of the bar 6 and extends out over the part 1 beyond the upper offset part 2 so that the end carrying the cutting edge 6a is positioned in spaced relation to the lower offset part 1. One side wall 3a (or both side walls) of the groove 3, as well as the corresponding side surface of the bar 6, slopes downwardly and outwardly so that the groove 3 and the bar 6 are broader at the bottom than at the top. In this manner the bar 6 is prevented from being raised or pushed upwards from the groove 3. The bar is inserted into the groove 3 in longitudinal direction from one end of said groove.

The cutting edge, or cutter, 6a co-operates with an upper movable shear cutter 7a mounted on a slide 7 which is displaceable in a vertical guide 8 so that the slide can move upwardly and downwardly in relation to the lower cutter 6a, for instance by being operated by an eccentric 11 on a shaft 12, which can be rocked by means of a lever (not shown). During this movement the cutter 7a is guided closely adjacent to the cutter 6a so that a piece 9 of sheet metal or the like (Fig. 2), for instance a packing strap of steel, will be cut or sheared on the downward movement of the cutter 7a. As shown in the drawing, the longitudinal direction of the groove 3 inclines at a slight angle to the mutually parallel edges of the cutters 6a, 7a. Thus, the cutting edge of the cutter 6a is parallel to the plane of the cutting movement of the cutter 7a but inclines to the direction of displacement of the bar 6 by a small angle.

In order to obtain an effective shearing action it is desirable that the transverse space or gap A (Fig. 2) between the two shear cutters shall be small. According as the cutters are worn said space will be broadened after some time of use. The invention provides for an adjustment of said space by arranging the bar 6 displaceable longitudinally in its groove 3, which, as aforesaid, inclines to the parallel cutters 6a, 7a. The adjustment is effected in such a manner that after loosening the clamping screws 5 the bar 6 is pushed forwardly in its groove 3 until the space or gap A is adjusted to the proper magnitude, whereupon the screws 5 are drawn down or tightened again.

The inclination angle of the groove 3 may, for instance, be between 1° and 15°, preferably one or a few degrees but the invention is not restricted to this range.

If desired, the movable upper cutter 7a may be adjustable similarly, instead of or in addition to the fixed lower cutter 6a. Moreover, the cutting movement may take place by a mutual motion of both cutters.

A die 10 is adapted to engage the lower surface of the slide 7, both elements providing cooperating punching surfaces so as to interlock the ends of two steel straps in a manner known in connection with strapping apparatus.

The invention is not restricted to the embodiment now described but changes and modifications may be made therein without departing from the scope of the invention.

What I claim is:

1. An adjustable shearing device comprising in combination a pair of shear blades having cutting edges, means for reciprocating at least one of said blades close to the other blade to effect a shearing action between said cutting edges, means defining a guideway for one of said blades inclined at a slight angle to the cutting edges of said blades, said guided blade being displaceable lengthwise of said guideway to move the cutting edge of said guided blade closer to but longitudinally displaced relative to the other cutting edge, said guided blade further having a cutting edge longer than that used at a particular setting of the blades.

2. An adjustable shearing device as claimed in claim 1, wherein the angle of inclination between said guideway and said cutting edge is within the range 1 to 15 degrees.

3. An adjustable shearing device comprising, in combination, a vertically reciprocable shear blade having a cutting edge extending substantially at right angles to the direction of movement of said blade, a normally stationary horizontally extending elongated shear blade having a cutting edge along one side thereof in slightly inclined relation to the length of said blade and extending substantially at right angles to the direction of movement of said movable blade in parallel relation to the cutting edge of said movable blade, means for supporting said stationary blade including a guideway for said blade permitting of adjustment of said blade lengthwise in a horizontal plane at a slight angle to the cutting edge thereof to bring closer and displace longitudinally said cutting edge of said horizontal blade relative to said cutting edge of said vertically movable blade while preserving the parallel relation of the cutting edges of said blades.

References Cited in the file of this patent
UNITED STATES PATENTS

| 2,098,159 | Peiseler | Nov. 2, 1937 |
| 2,178,710 | Valiquette | Nov. 7, 1939 |
| 2,245,711 | Rafter | June 17, 1941 |
| 2,339,641 | Jensen | Jan. 18, 1944 |
| 2,386,652 | Borg | Oct. 9, 1945 |